UNITED STATES PATENT OFFICE.

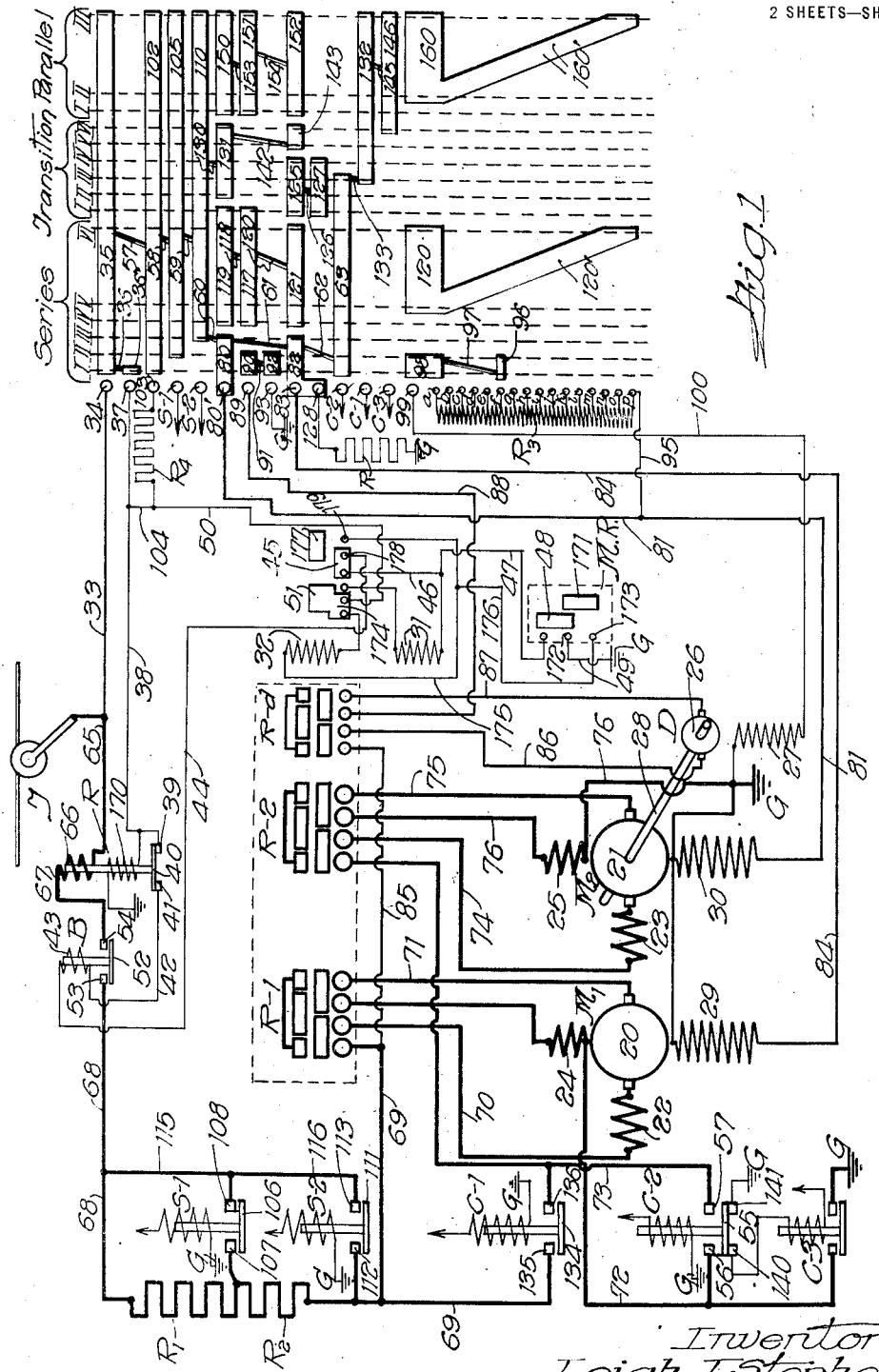

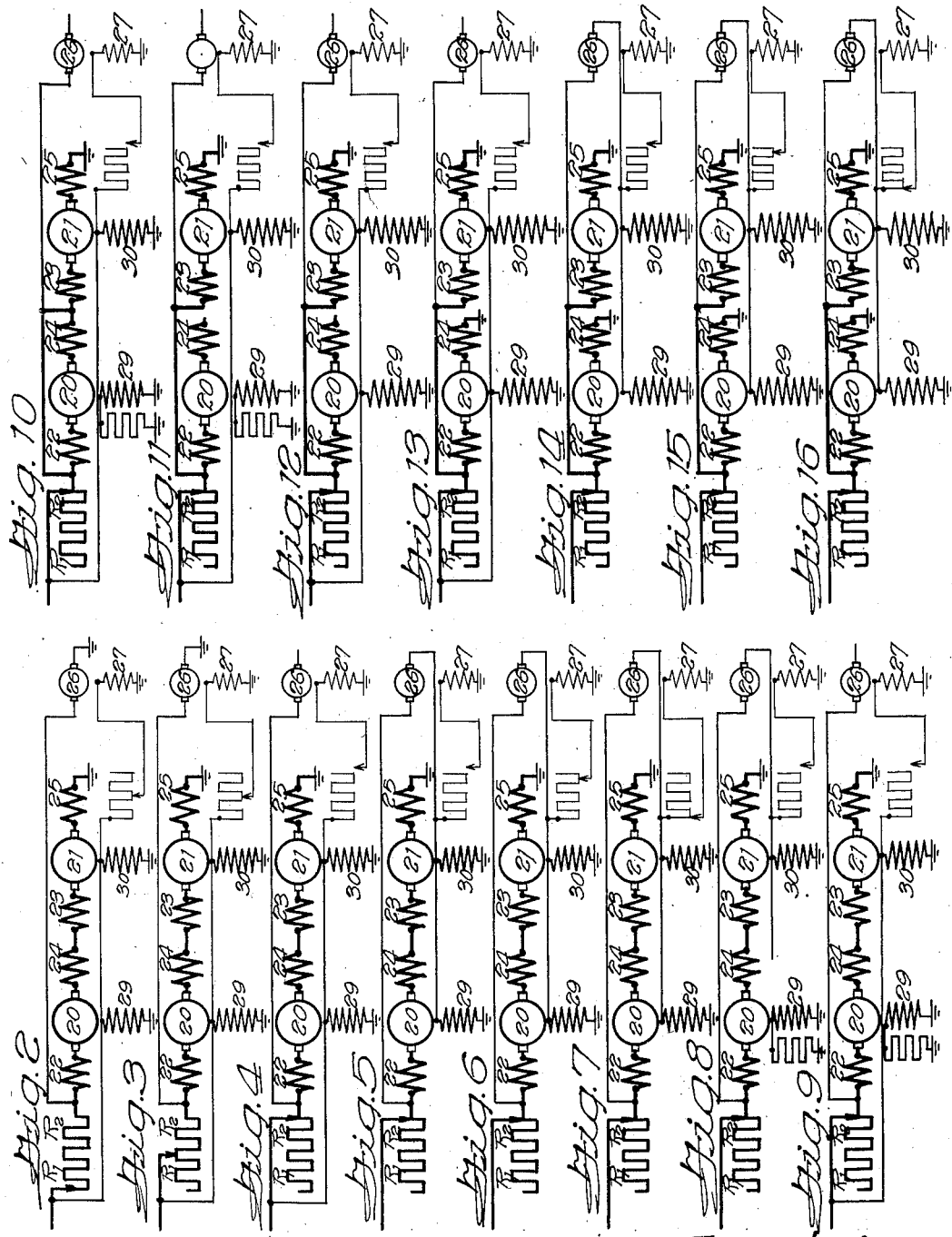

LEIGH J. STEPHENSON, OF CHICAGO, ILLINOIS, ASSIGNOR TO WILLIAM T. FENTON, BENJAMIN V. BECKER, LYNN A. WILLIAMS, GEORGE B. BURRAGE, AND LEIGH J. STEPHENSON, TRUSTEES, ALL OF CHICAGO, ILLINOIS.

SYSTEM OF MOTOR CONTROL.

1,389,080.        Specification of Letters Patent.     Patented Aug. 30, 1921.

Application filed November 28, 1919. Serial No. 341,243.

*To all whom it may concern:*

Be it known that I, LEIGH J. STEPHENSON, a citizen of the United States, and resident of Chicago, in the county of Cook and State of Illinois, have invented a certain new and useful Improvement in Systems of Motor Control, of which the following is a full, clear, concise, and exact description, reference being had to the accompanying drawings, forming a part of this specification.

My invention relates to an improved system of motor control, and is especially concerned with the provision of means for controlling a plurality of motors connected to drive the same mechanism, means being provided for controlling the speed of the motors, their direction of rotation, and for accomplishing regenerative braking. While my invention is not limited to use in connection with electrically propelled vehicles, I shall, for the purpose of illustration, describe it in connection with its use for propelling an electric vehicle, and specifically, for the propulsion of an electric railway vehicle.

My invention is especially concerned with the provision of a control system in which a regulating dynamo is connected with the field windings of the motors in such a manner that its counter-electromotive force will oppose the potential impressed upon the motor field windings, the regulating dynamo being connected with the motor so as to rotate at a speed substantially proportional to the speed of the motor, whereby the field strength of the motors is so controlled as to cause the motors to have the accelerating characteristics of a series motor, although the motors have some of the mechanical details of construction of a shunt motor, and may, if desired, be likewise given the electrical characteristics of a shunt motor.

The objects of my invention are:

First: To provide a system of control of the character described, which embodies a plurality of contactors controlled by master controllers, so that it is unnecesssary to carry the motor current carrying conductors to the control mechanism;

Second: To provide a control mechanism of the character described, which is peculiarly adapted to the system of motor control referred to above;

Third: To provide motor control means for motors controlled as described above, which is simple in construction, economical to manufacture, and which will require a minimum expenditure for maintenance;

Fourth: To provide a system of motor control embodying a novel line circuit breaker, which will be responsive to overload when the motors are functioning as motors, but which will not be responsive to overload when the motors are functioning as generators, to return current to the line, the breaker being of such construction that in the event the potential of the line is reduced to zero or to any predetermined low value, the motorman will be compelled to return the controller lever to the first position before he will be able to start the car; and Fifth: To provide novel means for properly controlling the direction of the flow of current through the motors and the regulating dynamo so as to cause a reversal of the direction of rotation of the motors.

Other objects and adaptations will appear as this description progresses, reference being had to the accompanying drawings, in which—

Figure 1 is a schematic diagram of certain of the electrical and mechanical connections between the elements forming my improved control system; and Fig. 2 to 16 inclusive are schematic diagrams showing the electrical connections corresponding to the various positions of the controller lever.

Throughout the specification and drawings similar reference characters will be used for referring to similar parts.

In my Reissue Patent No. 14,787, of January 6, 1920, I have described a system of motor control comprising a motor having a field winding in the nature of a shunt field winding, and a regulating dynamo connected in series with the field winding of the motor so as to form a field winding circuit which may be connected across the line or to any other source of potential, the regulating dynamo being so connected with the field winding that its counter-electromotive force opposes the potential impressed across the field winding circuit. Mechanical means are provided for causing the regulating dynamo to rotate at a speed substantially proportional to the speed of rotation of the motor. The regulating dynamo is provided with a field winding, which is shown as being connected in parallel with the field winding of the motor, so that there will always be a constant proportionality between the currents flowing in the motor field winding and in the regulating dynamo field winding. The field circuit of the regulating dynamo is provided with an adjustable resistance, whereby its voltage may be controlled as desired. By means of this adjustable rheostat the voltage of the regulating dynamo can be so controlled as to weaken or strengthen the field of the motor, as desired, thereby controlling not only the speed of the motor, but making it possible to cause the motor to act as a generator to return current to the line, and at the same time bring the motor to a stop.

In my present invention I have provided a system of remote control for a plurality of motors of the character described in my copending application above referred to, where this plurality of motors are used for driving a common mechanism, means being provided for taking advantage of the characteristics of the motor control system set forth in my above mentioned application, to provide a simple, reliable and economical means for controlling the operation of the motors.

Referring to the drawings, and for the present to Fig. 1, the reference characters $M_1$ and $M_2$ indicate as a whole a pair of motors having the armatures 20 and 21 respectively, the commutating field windings 22 and 23 respectively, and the series field windings 24 and 25 respectively. The reference character D indicates as a whole a regulating dynamo having the armature 26 and field winding 27. The armature of the regulating dynamo D is illustrated as being mounted upon the shaft 28 of the motor $M_2$, so that it will rotate at the same speed as the armature of this motor. For the sake of clearness the car wheels and the driving connections between the motors and the car wheels have been omitted, as those skilled in this art will readily perceive that the motors $M_1$ and $M_2$ can be connected with the wheels of the vehicle in any of the usual manners. The motors $M_1$ and $M_2$ are provided with the field windings 29 and 30 respectively. Reversing switches R—1, R—2 and R—d are provided for controlling the flow of current through the two motors and the regulating dynamo, so as to reverse the direction of rotation of the motors. These three reversing switches are all mounted upon the same drum, as indicated in the drawing, so that they may all be operated simultaneously to make the proper connections between the motors and the regulating dynamo, to cause a reversal of the direction of rotation of the motors. The drum of the reverse switch is actuated to its forward or reverse position by means of the solenoids 31 and 32 respectively, which may actuate an armature lever or other suitable means (not shown), connected with the drum carrying the reversal switches, in a well known manner. The electrical connections for energizing the solenoids 31 and 32 will be presently described.

The description of the remaining portions of the mechanism embodied in my invention will be referred to in describing the operation of the system.

When the controller lever (not shown) is moved to the first notch, current passes through the trolley T, the conductor 33, contact finger 34, contact 35, connector 36, contact 36', contact finger 37, conductor 38, contacts 39, 40 and 41 of a polarized relay indicated as a whole by the reference character R, through conductor 42, solenoid 43 of the line breaker indicated as a whole by the reference character B; from thence through the conductor 44, through contact 45 mounted on the same drum with reverse switches R—1, R—2 and R—d, conductors 46 and 47 and contact 48 of the master reverser M. R., and the conductor 49 to ground G. It should be noted that the circuit just described is not completed unless the reverse switch drum is in a position corresponding to the position of the master reverser; that is, if the master reverser is in its "forward" position the above circuit will not be completed unless the reverse switch drum is likewise in its "forward" position. In a similar manner the above circuit will not be completed when the master reverser is in the "reverse" position unless the reverse switch drum is likewise in its "reverse" position. The position of the reverse switch drum is controlled by the master reverser through the following circuit. When the master reverser is turned to "forward" current flows through the trolley T, conductor 33, contact finger 34, contact 35, connector 36, contact 36', contact finger 37, conductor 38, conductor 50, contact 51, on the reverse switch drum through the "forward" solenoid if the reverse switch drum is in its "reverse" position, conductor 47, contact 48 and conductor 49 to ground thereby energizing the coil 31 and throwing the reverse switch drum to its "forward" position. If at the time the controller lever is moved to its first notch, the reverse switch drum is in its "forward" position, the circuit last described will be open because the contact finger connecting the "forward" solenoid 31, with the contact 51 will be separated from this contact as shown in the drawing.

Upon the completion of the circuit through the solenoid 43 of the line breaker, contact 52 thereof will be brought into contact with contacts 53 and 54, thereby closing the line breaker. At the same time contactor C—2 is energized to bring its contact 55 into current carrying relation with contacts 56 and 57 through the following circuit:

Trolley T, contact finger 34, contact 35, connectors 57, 58, 59, 60, 61 and 62, contact 63, contact finger C—2 and from thence through a conductor not shown and the solenoid of the contactor C—2 to ground G. Current thereupon flows from the trolley T through the conductor 65, coil 66 of the polarized relay R, conductor 67, contacts 54, 52, and 53 of the line breaker, conductor 68, resistance sections $R_1$, $R_2$, conductor 69, reverser switch R—1, conductor 70, motor $M_1$, conductor 71, back through the reverse switch R—1, series field 24, conductor 72, contacts 56, 55 and 57 of contactor C—2, conductor 73, through the reverse switch R—2, conductor 74, through the motor $M_2$, conductor 75, back through the reverse switch, conductor 76, series field 25, to ground G. It will thus be seen that when the controller lever of the master controller is in its first notch or position, the two motors are connected in series with each other and in series with the resistance sections $R_1$ and $R_2$.

At this time, the fields of the motors $M_1$ and $M_2$ are energized through the following circuits:

From the trolley T, conductor 33, contact finger 34, contact 35 and connectors 57, 58, 59 and 60. From here the circuit divides half of the current going through the contact 80, contact finger 80', conductor 81 and field 30 to ground G. The other half of the current passes through the connector 61, contact 82, contact finger 83, conductor 84 and field winding 29 to ground G.

In order to assist the motors $M_1$ and $M_2$, I have provided means for connecting the dynamo to operate as a motor while the resistance sections $R_1$ and $R_2$ are being cut out. This circuit is as follows:

Trolley T, conductor 65, solenoid 66, conductor 67, contacts 54, 52, 53, conductor 68, resistance sections $R_1$ and $R_2$, conductor 69, conductor 85, through the reverse switch R—d, conductor 86, armatures 26 of the regulating dynamo D, conductor 87, through the reverse switch R—d, conductor 88, contact finger 89, contact 90, connector 91, contact 92, and contact finger 93 to ground G.

The field of the regulating dynamo is excited through the following circuit:

Trolley T, conductor 33, contact finger 34, contact 35, connectors 57, 58, 59 and 60, contact 80, contact finger 80', conductor 81, conductor 95, through a portion of the rheostat $R_3$, contact 96, connector 97, contact 98, contact finger 99, conductor 100 and through the field 27 of the regulating dynamo to ground G.

The regulating dynamo due to the connections just described adds its starting torque to the starting torque of the two motors.

When the controller lever is turned to notch II the circuits described above remain the same with the following exceptions:

The contact finger 37 is separated from the contact 36', thereby placing the resistance $R_4$ in series with the solenoid 43, through the following path:

Trolley T, contact finger 34, contact 35, connector 57, contact 102, contact finger 103, resistance $R_4$ and conductor 104, through the circuit previously described for energizing the solenoid 43. The resistance $R_4$ is of such value that while it will permit sufficient current to flow therethrough to hold the line breaker B closed, it will not permit sufficient current to flow through the solenoid 43 of the line breaker to close the line breaker in the event that the line breaker is opened by failure of the line voltage or for any other reason, thereby making it compulsory for the motor-man to return the controller lever to the first position whenever the line breaker opens before he can again energize the motors.

The only other change in the connections described above when the controller lever is moved to the second position is the closing of the contactor S—1 through the following circuit:

Trolley T, conductor 33, contact finger 34, contact 35, connectors 57 and 58, contact 105, contact finger S—1 through a conductor not shown and the solenoid of conductor S—1 to ground G. This causes contact 106 to close on contacts 107 and 108 of the contactor S—1 thereby short circuiting the resistance section $R_1$. By excluding the resistance $R_1$ from the circuit of the motors, the speed thereof is increased.

When the controller lever is moved to series position III, the armature circuit of the regulating dynamo is broken by reason of the separation of contact finger 89 from the contact 90 and its field winding circuit is opened by reason of the separation of the contact finger 99 from the contact 98. The regulating dynamo thereupon ceases for the time being to assist the motors in driving the car. The only other changes in the connections previously described are as follows:

Contact finger S—2 contacts with contact 110, thereby establishing the following circuit:

Trolley T, conductor 33, contact finger 34, contact 35, connectors 57, 58 and 59, contact 110, contact finger S—2, through a conductor not shown and through the solenoid contactor S—2 to ground G. The establishment of this circuit results in the closing of the contact III, upon the contacts 112 and 113 of the contactor S—2, thereby short circuiting the remaining section $R_2$ of the starting resistance. The two motors are now operating in series with all resistance cut out as indicated in Fig. 4.

Upon moving the controller lever to notch IV of the series positions, the circuit connections for the armatures of the two motors remain the same but the fields of the motors are connected in series with the armature of the regulating dynamo to form a field winding circuit which is connected directly across the line (see Fig. 5). This field winding circuit is as follows:

Trolley T, conductors 65, solenoid 66, conductor 67, contacts 54, 52, and 53, conductor 68, conductors 115 and 116, contacts 113, 111 and 112 of the contactor S—2, conductors 69 and 85, reverse switch R—d, conductor 86, armature 26 of regulating dynamo D, conductor 87 and again through the reverse switch R—d, conductor 88, contact finger 89, and contact 117.

From this point the current divides, half passing through the connector 118 and contact 119 to the contact finger 80' and from thence through the field winding 30 to ground as previously described and the other half of the current passing through connector 120, contact 121, and contact finger 83 and from thence through the field winding 29 to ground as previously described.

In this position of the controller lever, the potential impressed upon the field windings of the motors is reduced by reason of the resistance drop in the armature of the regulating dynamo and by reason of the counter-electromotive force which generates by reason of residual magnetization; consequently the speed of the motors is slightly increased.

When the controller lever is moved to notch V of the series positions, the field winding circuit of the regulating dynamo is placed in parallel with the field windings of the motors through the following connections:

Trolley T, conductor 65, solenoid 66, conductor 67, through the line breaker B, conductors 68, 115, and 116, contactor S—2, conductor 69 and 85, reverse switch R—d, conductor 86, regulating dynamo armature 26, conductor 87, reverse switch R—d, conductor 88, contact finger 89, contact 117, connector 118, contact 119, contact finger 80', conductors 81 and 95 through the rheostat $R_3$, contact 120 contact finger 99, conductor 100, and field winding 27 to ground. These connections are diagrammatically illustrated in Fig. 6.

Through the establishment of the field winding circuit of the regulating dynamo, the counter-electromotive force of the regulating dynamo is slightly increased thereby correspondingly weakening the fields of the motors and causing a further increase in their speed.

Further increase in the speed of the motors is obtained by bringing the portion 120', of the contact 120 successively into contact with the contacts b to p inclusive of the rheostat $R_3$ whereby the counter-electromotive force of the regulating dynamo is continuously increased and the fields of the motors similarly decreased (see Fig. 7).

When the controller lever is moved to notch I of the transition positions, the field winding 29 of the motor $M^1$ is short circuited through ground through the following circuit:

Ground G, field winding 29, conductor 84, contact finger 83, contact 125, connector 126, contact 127, contact finger 128, and discharge resistane R to ground G. At the same time the field winding 29 is disconnected from the field winding circuit previously described by reason of the separation of contact finger 83 from contact 121. Simultaneously, with the arrangement of the above connections, the contact finger 99 separates from contact 120 thereby completely opening the field winding circuit of the regulating dynamo and reducing its counter-electromotive force to substantially zero so that practically full line voltage is impressed upon the field winding of motor $M_2$ (see Fig. 8).

From the above description, it will be seen that the counter-electromotive force of motor $M_1$ has been decreased to substantially zero, and with the exception of a drop in potential due to resistance of the armature circuit of motor $M_1$, full line voltage is impressed upon the armature circuit of motor $M_2$. This motor is protected against an injurious surge of current because its field is substantially fully excited.

If the controller lever is now moved to notch II of the transition positions, the previously described connections remain substantially the same except that the field winding of motor $M_2$ is connected directly across the line through the following circuit:

Trolley T, conductor 33, contact finger 34, contact 35, connectors 57, 58, 59 and 130, contact 131, contact finger 80', conductor 81 and field winding 30 to ground G. These connections are diagrammatically illustrated in Fig. 9.

Upon moving the controller lever to notch III of the transition positions, the only change made in the above connections is to throw a jumper across motor $M_1$ through the following connections:

Contactor C—1 is energized by reason of the contact of contact finger C—1 with contact 132, the circuit through the solenoid of contactor C—1 being as follows:

Trolley T, conductor 33, contact finger 34, contact 35, connectors 57, 58, 59, 60, 61 and 62, contact 63, connector 133, contact 132, contact finger C—1, through a conductor not shown and the solenoid of contactor C—1 to ground G.

Through the establishment of the above connections, contact 134 is brought into contacting relation with contacts 135, and 136 thereby short circuiting motor $M_1$ (see Fig. 10).

The only change in the previous connections accomplished by moving the controller lever to notch IV of the transition positions, is to free one terminal of the motor $M_1$ (see Fig. 11). This results from a separation of contact finger C—2 from contact 63 which opens the circuit of contactor C—2 thereby deënergizing its solenoid and permitting its contact 55 to drop away from contacts 56 and 57 and make contact with contacts 140 141 thereby connecting one terminal of the solenoid of contactor C—3 with the ground G.

Upon moving the controller lever to notch V of the transition positions, the field winding of the motor $M_1$ is again thrown across the line (see Fig. 12) whereby the field of this motor and consequently its counter-electromotive force, are again restored to the maximum value. The circuit for the field winding of motor $M_1$ is as follows:

Trolley T, conductor 33, contact finger 34, contact 35, connectors 57, 58, 59, 130 and 142, contact 143, contact finger 83, conductor 84, and field winding 29 to ground G.

The next step in changing over to parallel connections is to connect the free terminal of motor $M_1$ with the ground which is accomplished through the closing of the contactor C—3. This is accomplished by energizing its solenoid through the following circuit, resulting from moving the contactor to notch VI of the transition positions:

Trolley T, conductor 33, contact finger 34, contact 35, connectors 57, 58, 59, 60, 61, 62, 133 and 145 contact 146, contact finger C—3, a conductor not shown, through the solenoid of the contactor C—3, the contacts 140, 55 and 141 of the contactor C—2 to ground G. The two motors are now operating in parallel with both fields in parallel directly across the line (see Fig. 13).

When the controller lever is moved to notch I of the parallel positions, the connection between the trolley and the two motor field windings is broken by reason of the separation of contact finger 80' from contact 131. At the same time, however, the armature of the regulating dynamo is connected in series with the two motor field windings, through the circuit described in connection with Fig. 5, which it is believed unnecessary to repeat. the contacts 150, 151 and 152 and the connectors 153 and 154 performing the same function as the contacts 119, 117 and 121 and the connectors 118 and 120, respectively.

The potential impressed upon the motor field windings is thereby reduced by reason of the resistance of the regulating dynamo armature circuit and the counter-electromotive force produced by its residual magnetism.

When the controller lever is moved to notch II of the parallel position, the field winding circuit of the regulating dynamo is again established by contact of the contact finger 99 with contact 160 in the same manner in which this field winding circuit was established by contact of the contact finger 99 with contact 120 while the two motors were connected in series, and as described in connection with Fig. 6. The counter-electromotive force of the regulating dynamo is by this connection slightly increased, thereby increasing the speed of the motors. To still further increase the speed of the motors, the resistance, $R_3$ is gradually cut out by bringing portion 160' of contact 160 successively into contact with the contact fingers $b$ to $p$. When all the resistance $R_3$ is cut out, the motors are at top speed for any given load condition.

In either the series or the parallel running position, the speed of the motor can be controlled between its lowest and highest running speed by merely moving the control drum to cut in or out more or less of the resistance $R_3$.

To accomplish regenerative braking in either the series or the parallel positions, the controller is moved to cut in more of the resistance $R_3$ into the field circuit of the regulating dynamo whereby its voltage will be decreased. The potential impressed upon the field windings of the motors will be increased and their voltage raised above line voltage so that they will actually return current to the line.

In bringing a car to a stop from its highest running speed, the operations described above are repeated in the reverse order. It is believed unnecessary to follow the different connections established during the reverse operation, and the results produced by these different connections as they will be readily understood from an inspection of Figs. 2 to 16 inclusive by any person skilled in the art to which this invention relates.

I have shown the polarized relay R as comprising the two solenoids 66 and 170 respectively. These solenoids are so wound and connected with their respective circuits that when the motors are functioning as motors they both tend to lift the contact 40 from the contacts 39 and 41 to open the circuit of the solenoid 43. I have so designed these two solenoids that the contact 40 will be separated from the contacts 39 and 41 only when the motors are drawing more than a predetermined amount of current, that is, the line breaker will be opened when the motors draw a predetermined overload.

It would be very undesirable to have the line breaker opened during regeneration by reason of the motors returning more than a predetermined amount of current to the line. Opening of the line breaker is prevented because during regeneration, by reason of the reversal of the current in the solenoid 66, the solenoids 66 and 170 will oppose and neutralize each other so that the contact 40 will not lift with overload braking current.

To reverse the direction of movement of the car the master reverse controller is shifted to bring the contact 171 of the master reverser into contact with contact fingers 172 and 173, thereby energizing the reverse solenoid 32 through the following circuit:

Trolley T, conductor 33, contact finger 34, contact 35, connector 36, contact 36', contact finger 37, conductors 104 and 50, contact 174, solenoid 32, conductors 175 and 176, contact finger 173 of the master reverser, contact 171, and contact finger 172 to ground G, whereupon the reverse switch is thrown to bring contact 177 under contact fingers 178 and 179 which must be, if the circuit through the solenoid 43 of the line breaker is to be completed, through the master reverser to ground. I wish to state in connection with the means which I have shown for controlling the reverse switch drum and the means for interlocking the reverse switch drum with the line breaker that these means form no part of my present invention but constitute portions of a well known system of control now in extensive use.

While I have described the details of the preferred embodiment of my invention, it is to be clearly understood that my invention is not limited to these details but is capable of other adaptations and modifications within the scope of the appended claims.

Having thus described my invention what I claim is:

1. The combination with a pair of motors having field windings of a regulating dynamo having a field winding, the armature of said regulating dynamo being connected in series with said field windings to form a field winding circuit, means for impressing a potential on said field winding circuit in a direction to oppose the counter-electromotive force of said regulating dynamo, means for supplying current to said regulating dynamo field winding at a rate constantly proportional with the flow of current in said motor field windings, means for controlling the operation of said motors comprising a contactor for connecting said motors in series, a contactor for short circuiting one of said motors, a contactor for grounding one terminal of one of said motors, remote control means for controlling the operation of said contactors, and an electrical interlock for preventing said grounding contactor from being closed when said first named contactor is closed.

2. The combination with a pair of motors having field windings of a regulating dynamo having a field winding, the armature of said regulating dynamo being connected in series with said field windings to form a field winding circuit, means for impressing a potential on said field winding circuit in a direction to oppose the counter-electromotive force of said regulating dynamo, means for supplying current to said regulating dynamo field winding at a rate constantly proportional with the flow of current in said motor field windings, means for controlling the operation of said motors comprising a contactor for connecting said motors in series, a contactor for short circuiting one of said motors, a contactor for grounding one terminal of one of said motors, control means for controlling the operation of said contactors, and an interlock preventing said grounding contactor from being closed when said first named contactor is closed.

3. The combination with a pair of motors, means for controlling the operation of said motors comprising a contactor for connecting said motors in series, a contactor for short circuiting one of said motors, a contactor for grounding one terminal of one of said motors, control means for controlling the operation of said contactors, and an interlock preventing said grounding contactor from being closed when said first named contactor is closed.

4. The combination with a motor of a power circuit for supplying current to said motor, a switch for controlling the flow of current through said circuit comprising a solenoid, a circuit for supplying current to said solenoid having a switch therein, a polarized relay for controlling the operation of said last named switch comprising two solenoids one of which is connected in series with said motor, means for supplying current to the other of said solenoids in such a direction as to assist the first of said solenoids when said motor is functioning as a motor, means for causing said motor to function as a generator to cause current to flow through the solenoid connected in series with said motor in a direction to oppose the action of said other solenoid when said motor is functioning as a generator, means for initially causing sufficient current to flow through the solenoid of said first named switch to close said switch, comprising an operating member having a plurality of positions, and means for reducing the current through said first named solenoid to such an extent that if deënergized it will cause said first named switch to stay open until said operating member is moved to its initial position.

5. The combination with a motor of a supply circuit for supplying current to said motor, a switch in said supply circuit, a solenoid for controlling said switch, a circuit for said solenoid having a second switch therein, a polarized relay for controlling said second switch, connected so that when current flows through said motor circuit in one direction, a current of given value will cause said polarized relay to open the circuit it controls, but when current flows through said motor in the opposite direction, said polarized relay is unaffected by overloads.

6. The combination with a dynamo connected to operate either as a motor or as a generator of a circuit for supplying current to said dynamo, or receive current therefrom, of a switch for said circuit, means for manually controlling the closing of said switch and means for opening said switch if the potential reaches zero or if the current during motoring reaches a predetermined high value, the said opening means being unresponsive to current generated by said dynamo when functioning as a generator.

7. A switch comprising means responsive to overload when current is flowing therethrough in one direction for opening said switch but unresponsive to current flowing in the other direction, the said means comprising means for causing said switch to open when the voltage of the circuit controlled by said switch reaches a predetermined low value.

8. The combination with a dynamo connected to function either as a motor or a generator of a circuit for supplying current to said dynamo and receiving current therefrom, a switch for controlling the flow of current through said circuit, comprising means responsive to overload current when said dynamo is operating as a motor, for opening said switch but unresponsive to current flowing when said dynamo is functioning as a generator, means for closing said switch, comprising a solenoid and a member, which in one position will cause sufficient current to flow through said solenoid to close said switch but which when in another position will cause insufficient current to flow through said solenoid to operate said switch, the said solenoid being so connected with the circuit that it will cause said switch to open in the event that the voltage impressed on said circuit falls to a predetermined value.

9. The combination with a dynamo connected to function either as a motor or a generator of a circuit for supplying current to said dynamo and receiving current therefrom, a switch for controlling the flow of current through said circuit, comprising means responsive to overload current when said dynamo is operating as a motor, for opening said switch but unresponsive to current flowing when said dynamo is functioning as a generator, means for closing said switch, comprising a solenoid and a member, which in one position will cause sufficient current to flow through said solenoid to close said switch but which when in another position will cause insufficient current to flow through said solenoid to operate said switch.

10. The combination with a plurality of motors having field windings of a regulating dynamo connected in series with said field windings in such a manner as to oppose the voltage impressed on said field windings, a reversing switch for each of said motors and for said regulating dynamo, remote control means for controlling the operation of said motors, and remote control means for causing all of said reversing switches to operate simultaneously.

In witness whereof, I hereunto subscribe my name this 25th day of November, 1919.

LEIGH J. STEPHENSON.

Witnesses:
 ANDREW WINTERCORN,
 EDNA V. GUSTAFSON.